Sept. 9, 1958 W. LIMBERGER 2,851,643

APPARATUS FOR TRANSMITTING THE MOVEMENT OF A POINT TO A DISTANCE

Filed Aug. 17, 1953 10 Sheets-Sheet 1

INVENTOR
WALTER LIMBERGER,

BY Bailey, Stephens & Huettig
ATTORNEYS

INVENTOR
WALTER LIMBERGER,
Bailey, Stephens & Huettig
ATTORNEYS

FIELD

INVENTOR
WALTER LIMBERGER,

BY Bailey, Stephens & Huettig
ATTORNEYS

Sept. 9, 1958

W. LIMBERGER 2,851,643

APPARATUS FOR TRANSMITTING THE MOVEMENT OF A POINT TO A DISTANCE

Filed Aug. 17, 1953

10 Sheets-Sheet 4

INVENTOR
WALTER LIMBERGER,

BY Bailey, Stephens & Huettig

ATTORNEYS

Sept. 9, 1958 W. LIMBERGER 2,851,643

APPARATUS FOR TRANSMITTING THE MOVEMENT OF A POINT TO A DISTANCE

Filed Aug. 17, 1953 10 Sheets-Sheet 5

INVENTOR
WALTER LIMBERGER,

BY Bailey, Stephens & Huettig
ATTORNEYS

Sept. 9, 1958

W. LIMBERGER 2,851,643

APPARATUS FOR TRANSMITTING THE MOVEMENT OF A POINT TO A DISTANCE

Filed Aug. 17, 1953

10 Sheets-Sheet 6

INVENTOR
WALTER LIMBERGER,

BY Bailey, Stephens & Huettig
ATTORNEYS

INVENTOR
WALTER LIMBERGER,
BY Bailey, Stephens & Huettig
ATTORNEYS

Sept. 9, 1958

W. LIMBERGER 2,851,643

APPARATUS FOR TRANSMITTING THE MOVEMENT OF A POINT TO A DISTANCE

Filed Aug. 17, 1953

10 Sheets-Sheet 8

INVENTOR
WALTER LIMBERGER,

BY Bailey, Stephens & Huettig

ATTORNEYS

INVENTOR
WALTER LIMBERGER,

BY Bailey, Stephens & Huettig
ATTORNEYS

INVENTOR
WALTER LIMBERGER,

BY Bailey, Stephens & Huettig
ATTORNEYS

United States Patent Office 2,851,643
Patented Sept. 9, 1958

2,851,643

APPARATUS FOR TRANSMITTING THE MOVEMENT OF A POINT TO A DISTANCE

Walter Limberger, Hamburg, Germany, assignor to Lumoprint Zindler K. G.

Application August 17, 1953, Serial No. 374,482

10 Claims. (Cl. 318—19)

The invention relates to a method and apparatus for the transmission of points or lines, at a variable scale if desired, and particularly its transmission to a distance. It includes both devices for guiding tools, for the location of vehicles and for writing at distance.

Prior devices of this type have been of a rather complicated nature, requiring the use of both sine and cosine mechanisms and multiplying devices. In some, a single device has been known both to multiply and to resolve the motion into its sine and cosine constituents.

In ordinary location devices for moving objects, the number of revolutions of the driving shaft are integrated by means of counting devices, so that it is possible to read off continuously the coordinates of the location of the vehicle with relation to the origin of the system. In some cases, the revolutions are transmitted to cross-linked type systems, which reintegrate continuously the components and thus represent the position of the transmitting point rapidly and to scale.

Devices of this type, in addition to being complicated, require great accuracy in their manufacture and are very sensitive and expensive.

Other disadvantages of these arrangements are that ordinarily the lines to be followed must be transferred on a greatly reduced scale onto a photographic plate by means of an expensive photographic system, and only then can they be followed by photographic means. The production of these photographic images almost always results in certain inaccuracies.

Another disadvantage of instruments of this type is that they can operate at most on two drawings or tracings, and that they must be located in the immediate vicinity of such drawings. They are therefore uneconomical in mass production. Also, they must be set up in the workroom itself and are exposed to interference by the machinery which they control.

The primary object of the present invention is to provide an arrangement which overcomes the disadvantages of the devices heretofore known.

A further object of the present invention is to provide an arrangement which is of simple and inexpensive construction, and which does not involve the complicated structures heretofore in use.

An additional object of the invention is to provide a method and device in which any slight inaccuracies in tracing on the part of the operator can be immediately corrected.

Still a further object of the invention is to provide a system in which the images can be transmitted at any desired scale with respect to the figure being traced.

It is a further object of the invention to provide an arrangement of this type which does not require the use of sine and cosine devices, whereby the expense involved in the provision of such devices is avoided.

Still an additional object of the invention is to provide an arrangement, the parts of which need not be as accurate and exact as those of the prior art.

Still another object of the invention, in one of its phases, is to provide an arrangement in which a line can be traced automatically by means of photoelectric or similar devices, and which embodies the automatic correction of any deviation from the line being traced.

It is still another object of the invention to provide an arrangement which can transmit the lines being copied over long distances, and can control a large number of receivers simultaneously at a considerable distance from the transmitter by a single transmitting arrangement.

Further objects and advantages of the invention will appear more fully from the following description, especially when taken in conjunction with the accompanying drawings which form a part thereof.

Figure 1:
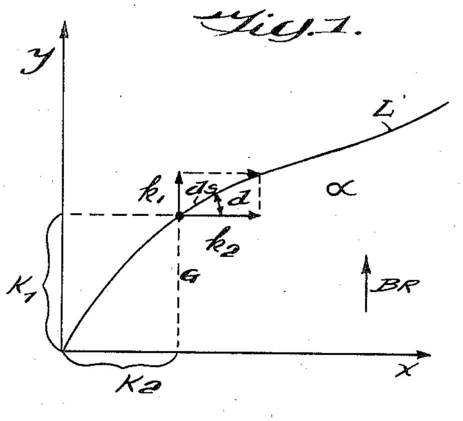
Fig. 1 is an explanatory diagram of the system utilized in prior art devices of this nature.

Referring to Fig. 1, it has been the practice in the prior art to utilize an arrangement in which a moving object G travelling along a line L controls a pointer or other arrangement whose movement is intended to follow that of the object G. In this figure, arrow BR represents an arbitrarily selected fixed direction and axes $x$, $y$ are respectively perpendicular and parallel to this fixed direction.

Assuming movement of the transmitter G along an infinitely small portion $ds$ of the line L, it is of course obvious that $ds$ equals $vdt$, $v$ being the velocity of G.

The two perpendicular components $K_1$ and $K_2$ of the point G are then continuously or periodically formed by measurements of the velocity and the direction of motion in accordance with the formula $K_1=vdt \sin \alpha$ and $K_2=vdt \cos \alpha$ and are transmitted to the receiver. The magnitude of $K_1$ is therefore $vdt \sin \alpha$ and the magnitude of $K_2$ is $vdt \cos \alpha$. In order to form the products $vdt \sin \alpha$ and $vdt \cos \alpha$, manual and electrical devices are required which perform the operations of the sine and cosine functions as well as the multiplication. Such devices may be of the well-known ball and friction wheel type which both resolve the components and multiply them, or separate resolving instruments and multiplying instruments may be used. These devices then drive a shaft the number of whose revolutions are functions of the products $vdt \sin \alpha$ and $vdt \cos \alpha$. The path of object G can then be traced by systems of crossed shafts driven in accordance with the values of these products, or in other well known ways.

Figure 2:
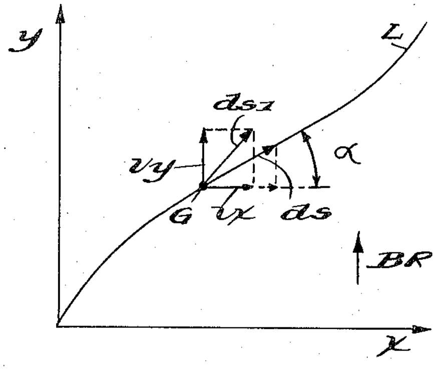
Fig. 2 is a similar diagram explanatory of the system used according to the present invention.
Figure 4:
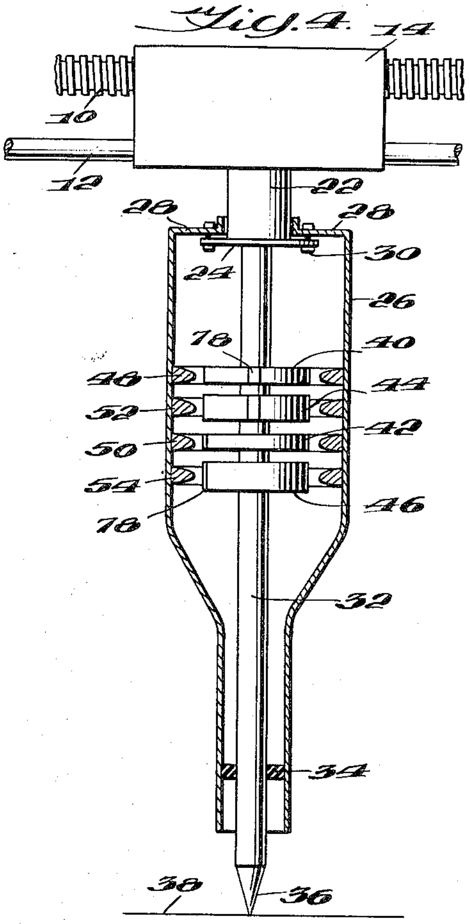
Fig. 4 is a side elevation of a portion of the mechanism shown in Fig. 3, with parts in section.

According to the present invention; and referring to Fig. 2, the infinitely small distance $ds$ is not resolved into components in accordance with the above formulae, that is in accordance with the sines and cosines of the angle, but in accordance with the formulae $V_y=vdt\, c\widehat{\alpha}$ and $$V_x=vdt\, c\left(\frac{\pi}{2}-\widehat{\alpha}\right)$$

in which $c$ is a constant. $V_x$ and $V_y$ are then two vectors parallel to the coordinates $x$ and $y$ respectively, but the resultant $ds_1$ is no longer exactly the same as the actual movement $ds$. The present invention provides an arrangement however by which the deviations of $ds_1$ from $ds$ are corrected, either by hand or automatically, as they occur, so that the line actually traced out by the receiver is substantially exactly in accordance with that followed by the transmitter G.

This is accomplished in general by submitting the transmitting body to movements which are the same as those of the receiver, so that any deviation of the receiver from the line being traced is immediately apparent in the transmitter, and is immediately corrected thereby.

With reference now to Figs. 3 to 7, the transmitter includes a pair of parallel threaded shafts 2 connected by a chain 4 so as to be driven at the same speed. One of these shafts is driven by a motor 6. On each of the shafts is mounted a nut 8, and in these nuts is rotatably mounted a threaded shaft 10. The transmitter also includes a fixed shaft 12 between the two nuts 8, and a threaded member or nut 14 which threadedly engages shaft 10 and slidably engages shaft 12. A motor 16 is mounted to move with nuts 8 and to drive shaft 10. Motors 6 and 16 also each drive three phase transmitters 18, 20, the purposes of which will be described below.

Depending from nut 14 is a stem 22 having an outward flange 24 at its lower end. A cylindrical casing 26 has at its upper end an inwardly directed flange 28 overlying flange 24, and the two flanges are connected by bolts or rivets 30 extending through holes therein. The rivets are slightly longer than the combined thickness of flanges 24, 28 and are somewhat loose in the holes, so that the casing 26 is capable of tilting slightly with respect to stem 22.

Rigid with the stem 22 and extending downwardly through the casing 26 is a stem 32. Between this and the casing 26, adjacent the reduced lower end of the casing, is a ring 34 of rubber or other resilient material which tends to hold the stem 32 centered within the casing 26. The lower end 36 of stem 32 is preferably pointed, and acts as a tracing point moving across table 38 on which the figure to be traced may be carried.

Stem 32 carries slip rings 40, 42 and potentiometer rings 44, 46. On the inner wall of casing 26 are contact rings 48, 50, 52 and 54 opposite slip rings 40, 42 and potentiometer rings 44, 46 respectively. These contact rings are of slightly greater diameter than the external diameter of the slip rings and potentiometer rings, so that when the stem 32 is held centered within casing 26 by rubber ring 34 there is no contact, such contact being however established when casing 26 is tilted in any direction.

Figure 3:
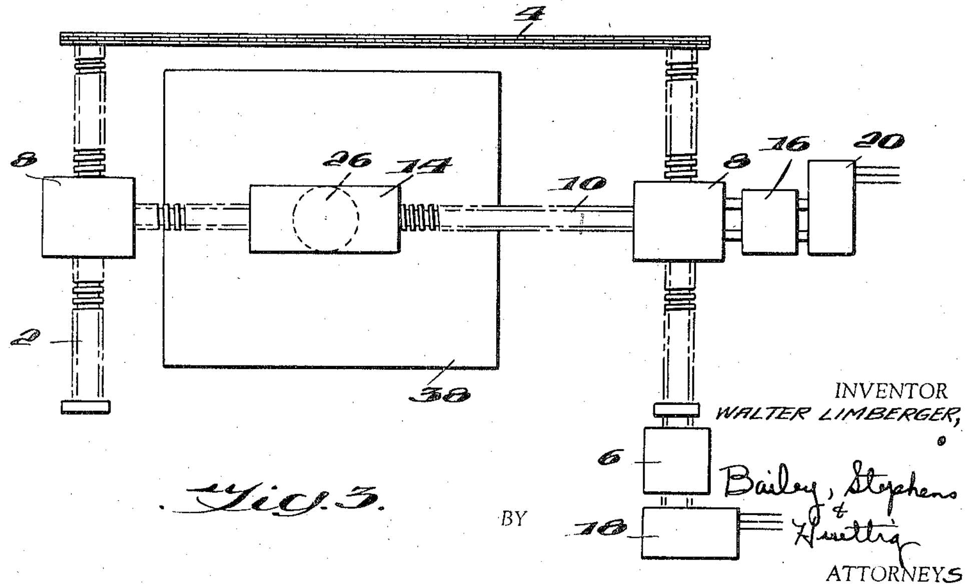
Fig. 3 shows in top plan view a device embodying one form of the present invention.
Figure 5:
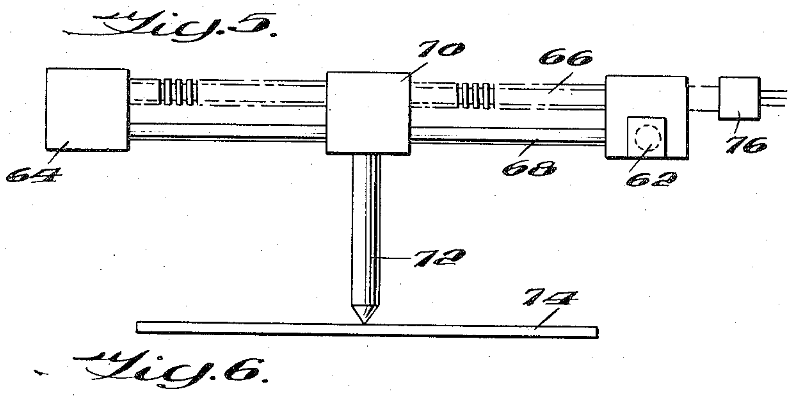
Fig. 5 shows the receiving device of this arrangement in side elevation.
Figure 6:
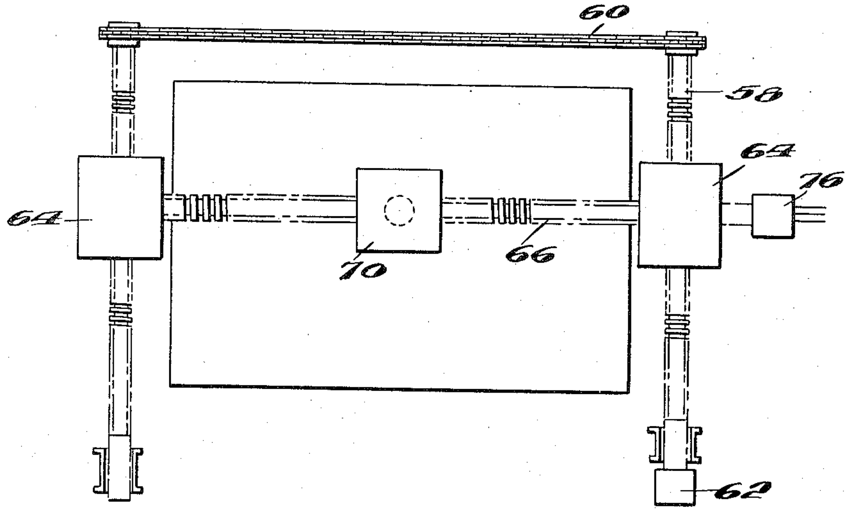
Fig. 6 is a top plan view of the receiver of Fig. 5.

The receiving device of this arrangement, shown in Figs. 5 and 6, includes a pair of threaded shafts 58 connected by a chain 60, and one of them driven by a motor 62 controlled from three phase transmitter 18 (Fig. 3). On each of these shafts is a nut 64, and in these nuts are mounted a threaded shaft 66 and a plain shaft 68. A nut 70 threaded on shaft 66 and slidable on shaft 68 carries a pointer, tracing element or the like 72 which moves over a table 74 to indicate or trace the movement of point 36. Shaft 66 is driven by a motor 76 controlled by three phase transmitter 20 of Fig. 3.

It will be noted that rings 40, 42, 44 and 46 are each divided into two halves by insulation 78.

These dividing portions of insulation are arranged in planes at right angles to each other on rings 40, 44 and 42, 46 respectively. The conducting portions on slip rings 40 and 42 are composed of a low resistance material whereas the conducting portions of potentiometer rings 44, 46 are composed of a material having a substantial electric resistance.

Figures 7, 9:
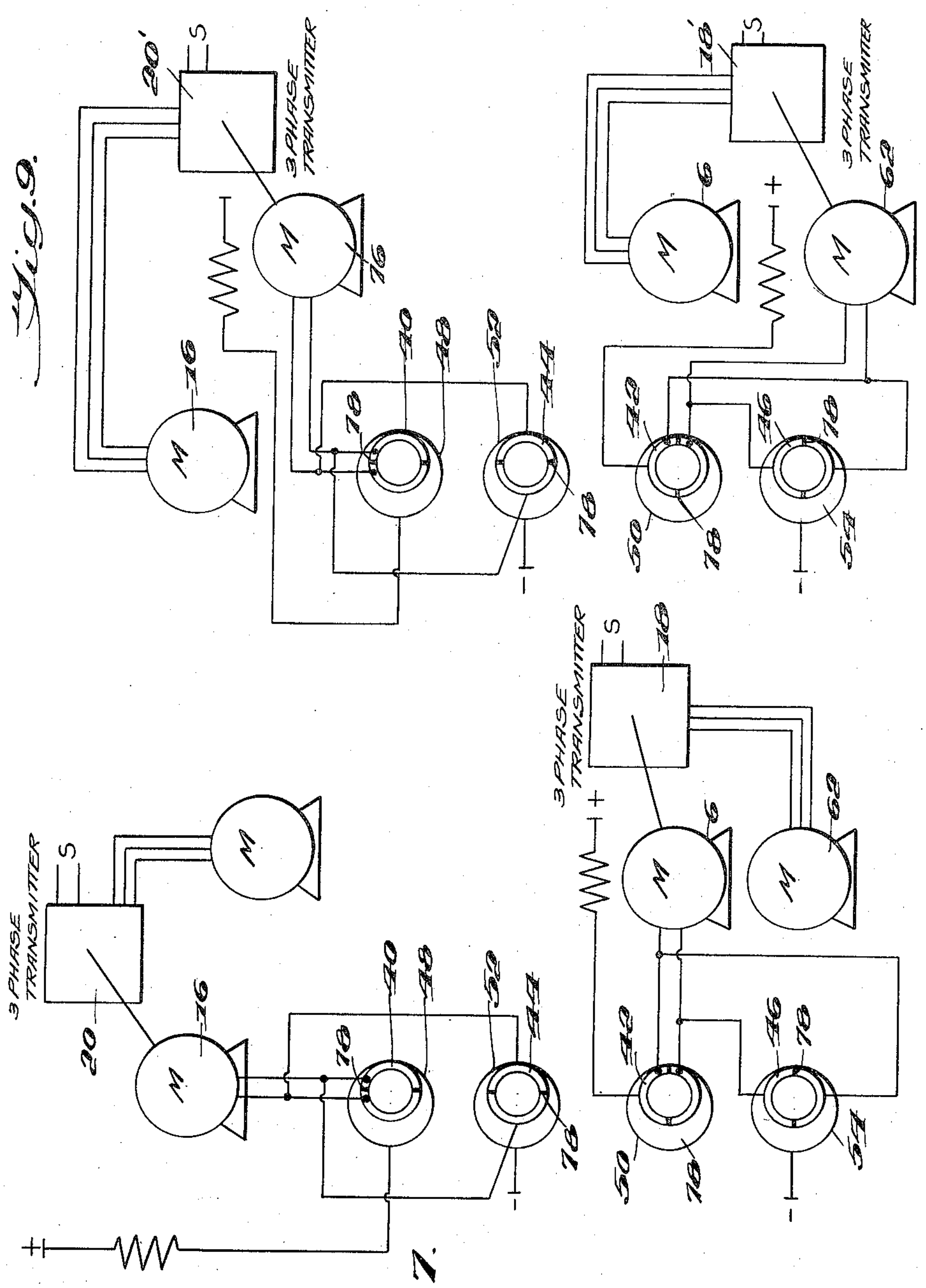
Fig. 7 is a wiring diagram of the arrangement of Figs. 3 to 6.
Fig. 9 is a wiring diagram of a modified form of the device.
Figure 10:
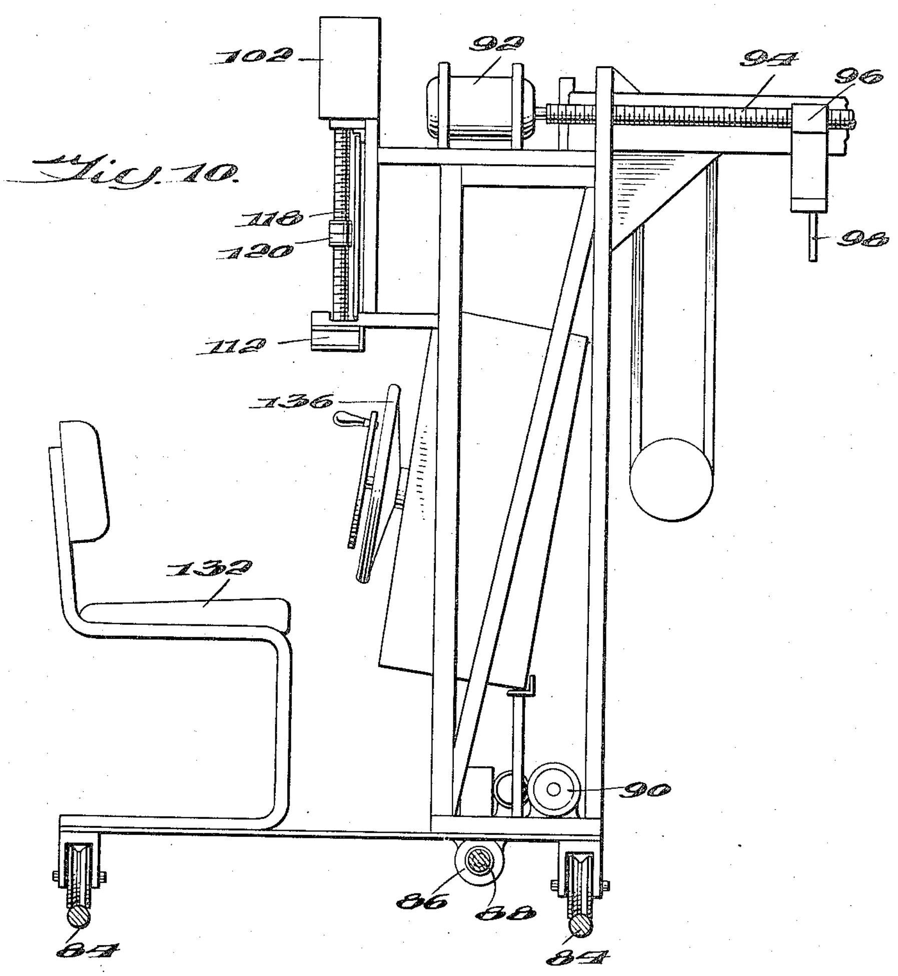
Fig. 10 shows in side elevation a modified form of device embodying the invention.
Figure 11:
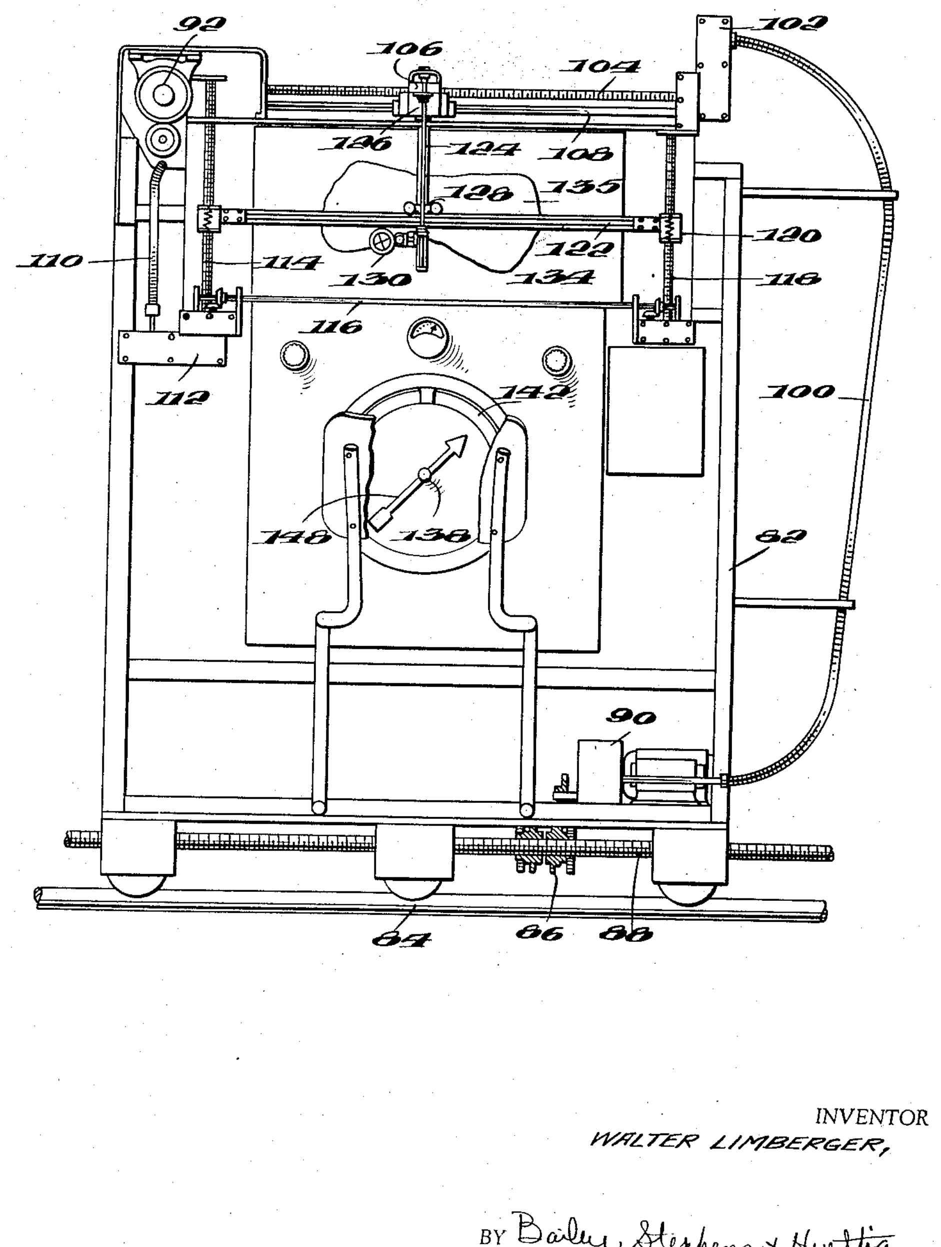
Fig. 11 is a front view thereof.

With reference now to Fig. 7, the arrangement hereinabove described operates as follows:

The operator by hand tilts the casing 26 in such a direction as will tend to move the point 36 along the line to be traced. Assuming that this direction is for example to the left in Fig. 4, contact rings 48, 50, 52 and 54 will engage the right hand sides of rings 40, 42, 44 and 46 respectively.

When this occurs, as is clear in Fig. 7, current will flow from the positive side and pass through the field winding of motor 16 to the contact ring 48, to the right hand half of slip ring 40, thence to one side of the motor 16, and from the other side of motor 16 to potentiometer ring 44, contact ring 52 and the negative side of the current source. Motor 16 will then be driven, operating at substantially its highest speed because it contacts potentiometer ring 44 at the point at which this ring is connected to the motor 16, so that the resistance of the potentiometer ring is at a minimum.

Motor 16 will then simultaneously drive shaft 10 and, through three phase transmitter 20, will cause motor 76 to operate at a proportionate speed. Nuts 14 and 70 will then be shifted simultaneously and proportionally to the left, thus causing both pointers 36 and 72 to move to the left in the desired direction.

Rings 42 and 46 contact rings 50 and 54 with their insulating portions, so that no current is imparted to motor 6 and no movement along the $y$ axis will take place.

Figure 8:
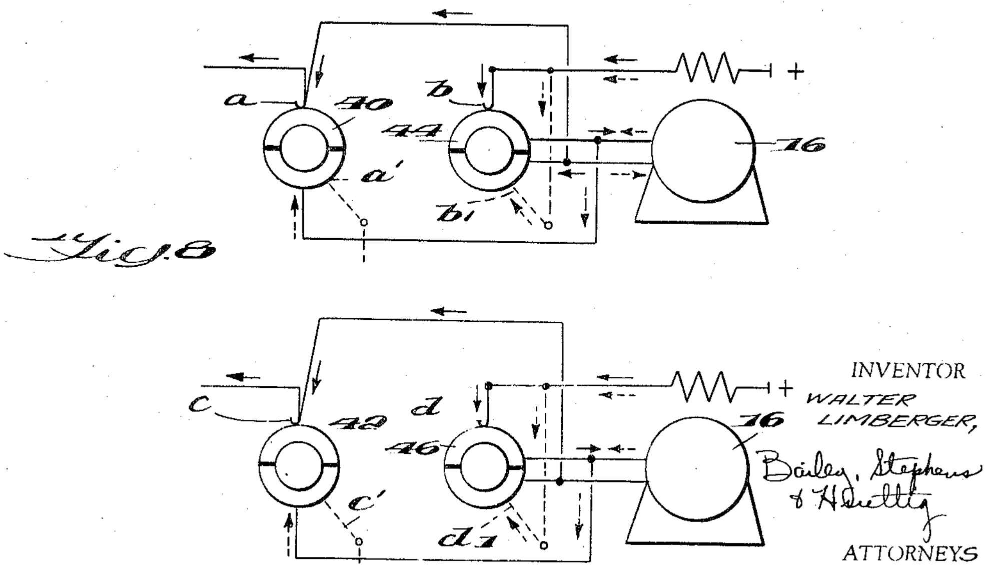
Fig. 8 is an explanatory wiring diagram.

Fig. 8 shows diagrammatically the operation of the device when casing 26 is tilted at an angle to both axes. In this figure, the parts indicated as brushes $a$, $b$, $c$ and $d$, represent actually the points of contact between contact rings 48, 52, 50 and 54, respectively with rings 40, 44, 42 and 46. The solid line showing is representative of the position shown in Fig. 7. If casing 26 is tilted upwardly and to the right in Fig. 7, contact will be made at points $a'$, $b'$, $c'$ and $d'$ respectively, and the circuit will follow the broken arrows in Fig. 8. Under these circumstances, current will flow from the positive side of the source to point $b'$ on potentiometer ring 44, and thence to one side of the motor and to the other side of the motor to slip ring 40, and from point $a'$ to the negative side of the current source. Since the current must traverse approximately 30° of the extent of one part of potentiometer ring 44, there will be a resistance introduced into the circuit which is proportional to the angle $\alpha$ so that motor 16 will be driven at less than its maximum speed. At the same time, current from the positive side of the source will flow to point $d'$, then through a portion of potentiometer ring 46 to one side of motor 6, and from the other side of the motor to slip ring 42, to the point $c'$ of the negative side of the source.

Because actually rings 40 and 44 are arranged at right angles to rings 42 and 46 (although shown parallel in Fig. 8), the angle between point $d'$ and the connection to the motor will be complementary to the point between angle $b'$ and its connection to motor 16. In other words, one of these angles will equal $\hat{a}$ while the other will equal $$\frac{\pi}{2}-\hat{a}$$

Thus the resistance imparted will be respectively proportional to these two angles.

As a result, points 36 and 72 will be moved along line *ds* (Fig. 2). This however will tend to carry the point 36 slightly away from the line which it is tracing. The operator however, in attempting to keep point 36 on the line, will tilt casing 26 in such a direction as to follow this deviation, and will then automatically control the device so that it follows the desired line almost exactly.

Obviously it is not essential that the motors which shift the transmitting element should control the receiver, the opposite being equally possible. For example, as shown in Fig. 9, motors 62 and 76 are controlled by the slip rings, and they in turn drive three phase transmitters 18', 20', which in turn regulate motors 6 and 16 respectively.

The device of Figs. 10 to 14 operates on the same principle, but allows the operator to control the movement by observation rather than by direct manipulation of the pointer itself.

In this arrangement, the carriage 82 is arranged to move transversely on rails 84, being shifted along the carriage by rotation of a nut 86 engaging a fixed threaded shaft 88. Nut 86 is driven by a motor 90. This provides for the transverse movement of the tool, the movement of which in the other direction is produced by a motor 92 mounted on the carriage and driving a threaded shaft 94 on which is engaged a nut 96 carrying the pointer, tracing tool or the like 98.

Motor 90 through flexible shaft 100 and gearing 102 drives threaded shaft 104, on which is threadedly engaged a nut 106 prevented from rotation by a fixed shaft 108 on which it slides. Motor 92 through flexible shaft 110 and gearing 112 drives threaded shaft 114, which in turn through shaft 116 and gearing drives parallel shaft 118. Nuts 120 mounted on shafts 114, 118 are connected by a cross bar 122.

Rotatable shaft 124 may be driven by a motor 126 mounted on nut 106. Slidable on this shaft is a frame 128 which is connected with bar 122, so as to move back and forth along shaft 124 and nuts 120 move along shafts 114, 118. Through splined gears on shaft 124 rotation may be imparted to a ring 130 carried by frame 128, and provided with cross-hairs.

The control is performed by an observer who sits in seat 132 in a position to observe table 134, on which is positioned the figure 135 to be traced. Ring 130 is positioned to move across this table in various directions, and at various angles. The observer by handwheel 136 turns shaft 138 provided with an arm 140 the outer end of which moves between two potentiometer discs 142, 144 respectively. Each of these discs is separated into two parts by insulation 146, the insulation on one disc being at right angles to that on the other disc. Shaft 138 also carries a pointer 148 by which the operator can determine the position of arm 140. Also operated by shaft 138 is a control member 150 which is electrically connected with motor 126 so that motor 126 follows the rotation in either direction of the control member 150.

Figures 12, 13, 14:
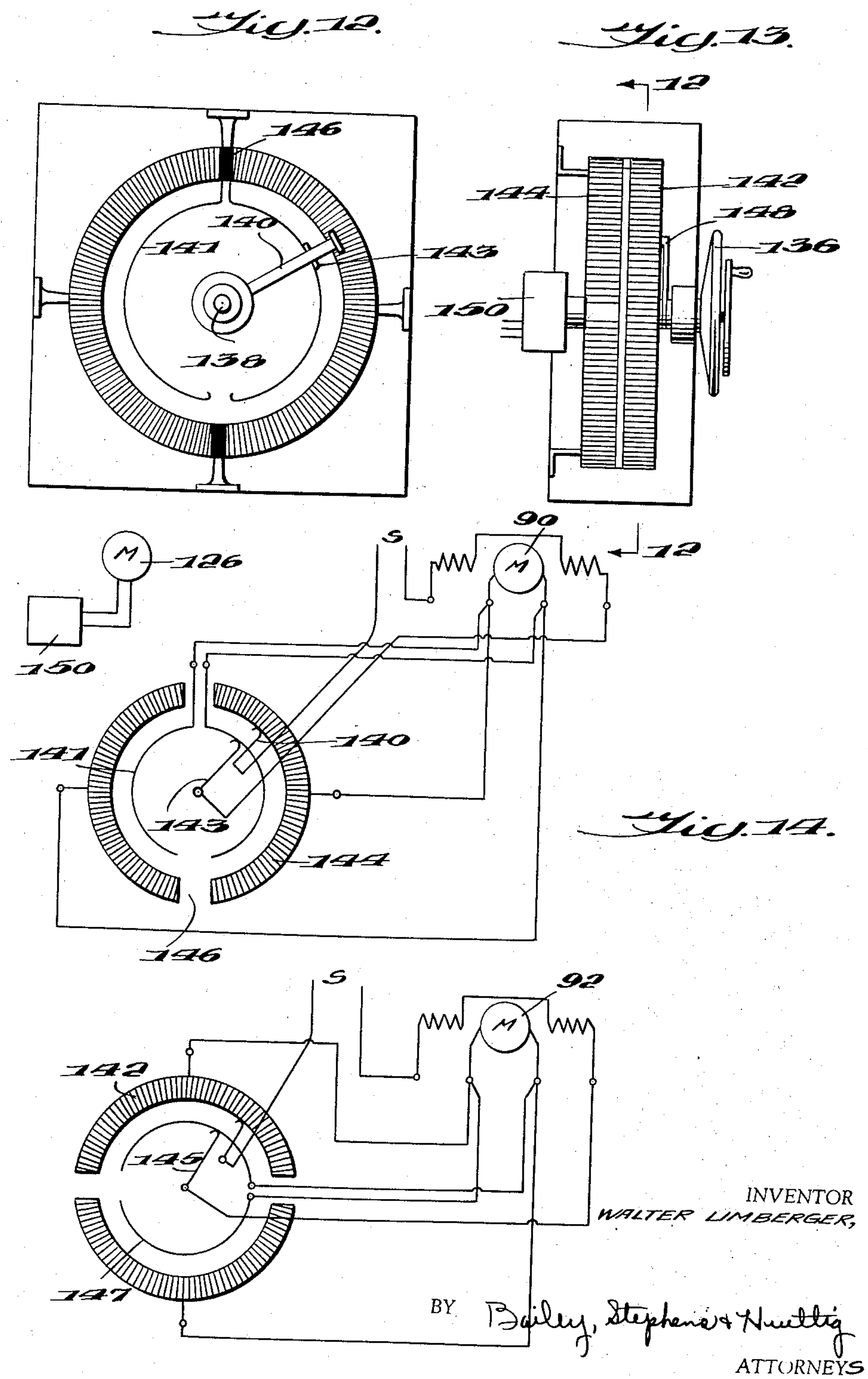
Fig. 12 shows on an enlarged scale the control member of the device of Figs. 10 and 11 in section, substantially along the line 12—12 of Fig. 13.
Fig. 13 shows this device in side elevation.
Fig. 14 is a wiring diagram of the arrangement of Figs. 10 to 13.

Fig. 14 shows the wiring diagram of this arrangement. It will be apparent that potentiometer ring 142 controls motor 92, the amount of current which it furnishes to the motor being proportional to the angle between arm 140 and the vertical, while ring 144 will control motor 90 in proportion to the angle between arm 140 and the horizontal. Thus ring 130 will always tend to move in the direction in which the arrow 148 is pointing. The observer by watching the cross-hairs on ring 130 with respect to the line to be traced will continually adjust handwheel 136 in such a way that the center of the cross-hairs will substantially follow the line 135 to be traced, while one of the cross-hairs is turned to follow changed in the direction of the line being traced.

Of course this movement is transmitted to the ring C by flexible shafts 100, 110, so that the movement of ring C substantially follows the course of the tool 98.

Figure 15:
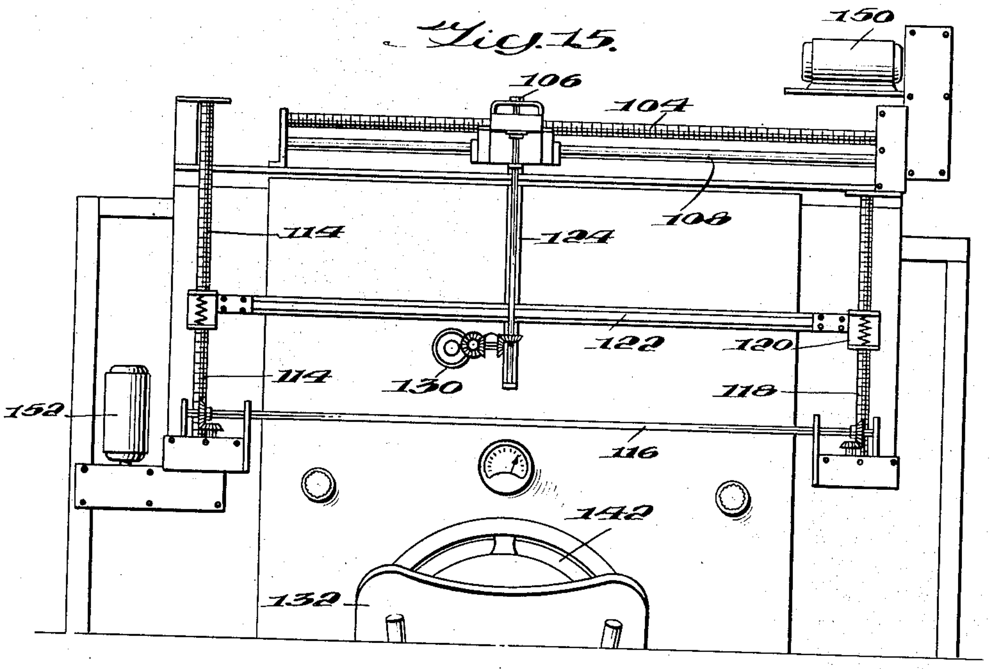
Fig. 15 shows in front elevation a portion of another modified form of the device.
Figure 16:
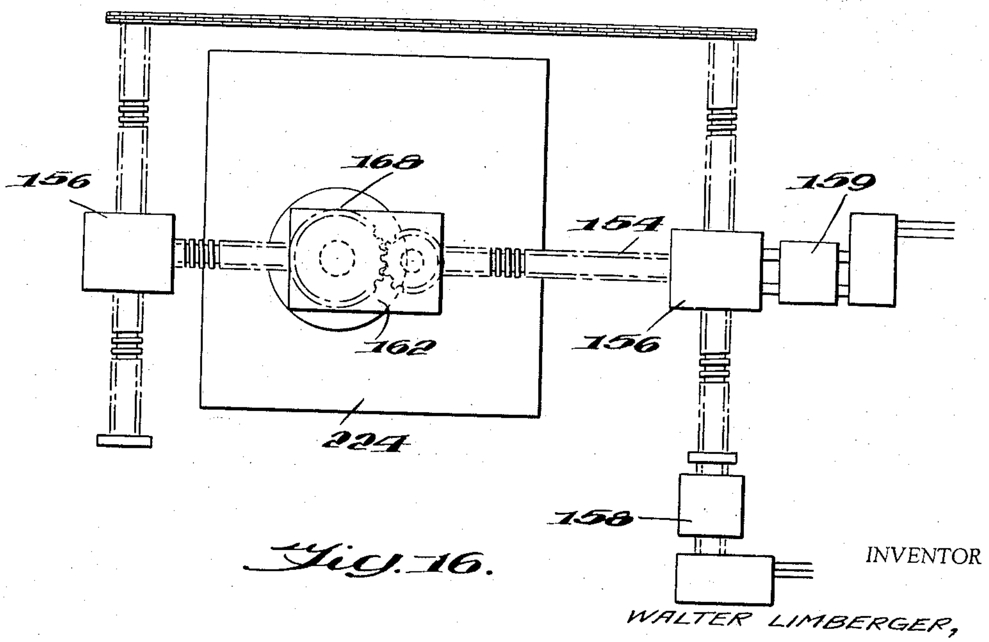
Fig. 16 shows in top plan view a further modification of the arrangement according to the invention.

Fig. 15 shows a modified form of the arrangement of Figs. 10 to 14. In this, instead of driving the shafts 104, 114, by flexible shafts 100, 110, these shafts are driven by motors 150, 152, controlled from the receiver, which in this instance is at a remote point. The circuit would then be of the nature of that shown in Fig. 8.

Referring now to Figs. 16 to 21, these disclose an arrangement in which the correction of deviations is made automatically, preferably by a photoelectric device.

In this arrangement, a threaded shaft 154 driven by motor 159 is mounted to turn in nuts 156 which in turn are displaced by threaded shafts 157 driven by a motor 158. Nuts 156 also carry a smooth shaft 160, and a nut 162 is threaded on shaft 154 and slidably engages shaft 160.

Depending from nut 162 is a stem 164, on which is turnably mounted a casing 166, this turning about a vertical axis. Casing 166 has on its exterior a gear 168 meshing with a gear 170 driven by motor 172 carried by nut 162.

Casing 166 has a narrowed lower end 174, in the bottom end of which is a lens 176. Positioned at the focal point of lens 176 are three photoelectric cells 178, 180 and 182, arranged in a generally triangular position as shown for example diagrammatically in Figs. 19 to 21. These three cells feed amplifiers 184, 186 and 188 of conventional construction preferably mounted within the casing 166.

Extending downwardly from nut 162 within casing 166 is a shaft 190. This shaft carries slip rings 192, 194 and potentiometer rings 196, 198. It also carries contact rings 200, 202 and 204, and adjacent its top end a series of contact rings 206. Brushes 208, 210, 212 and 214 cooperate with rings 192, 194, 196 and 198 respectively, and additional brushes 216, 218 cooperate with rings 200, 202 and 204 and with rings 206 respectively.

Figures 18, 22:
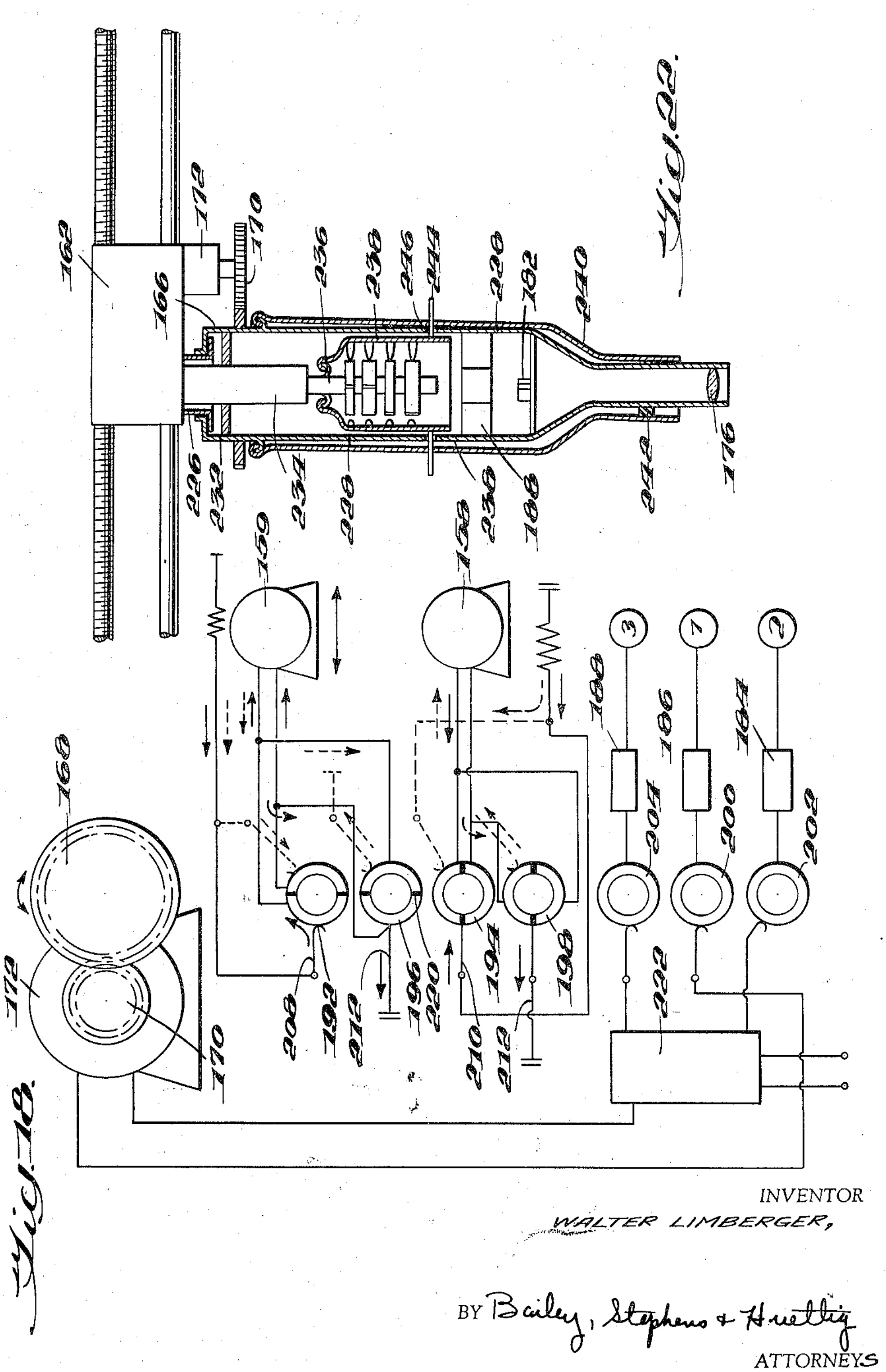
Fig. 18 is a wiring diagram of the arrangement of Figs. 16 and 17.
Fig. 22 shows in side elevation with parts in section, a portion of still another form of the device according to the invention.

This is the tracing element of the mechanism, the receiving element of which may be similar to that shown in the other figures of the drawings. Fig. 18 shows the wiring diagram of the arrangement of Fig. 17. In this diagram, it will be noted that the insulating dividers 220 of the slip rings and potentiometer rings are at right angles to each other in the two sets of rings. 222 is a conventional electric commutator, the operation of which in the system will be explained hereinafter.

Figures 17, 19, 20:
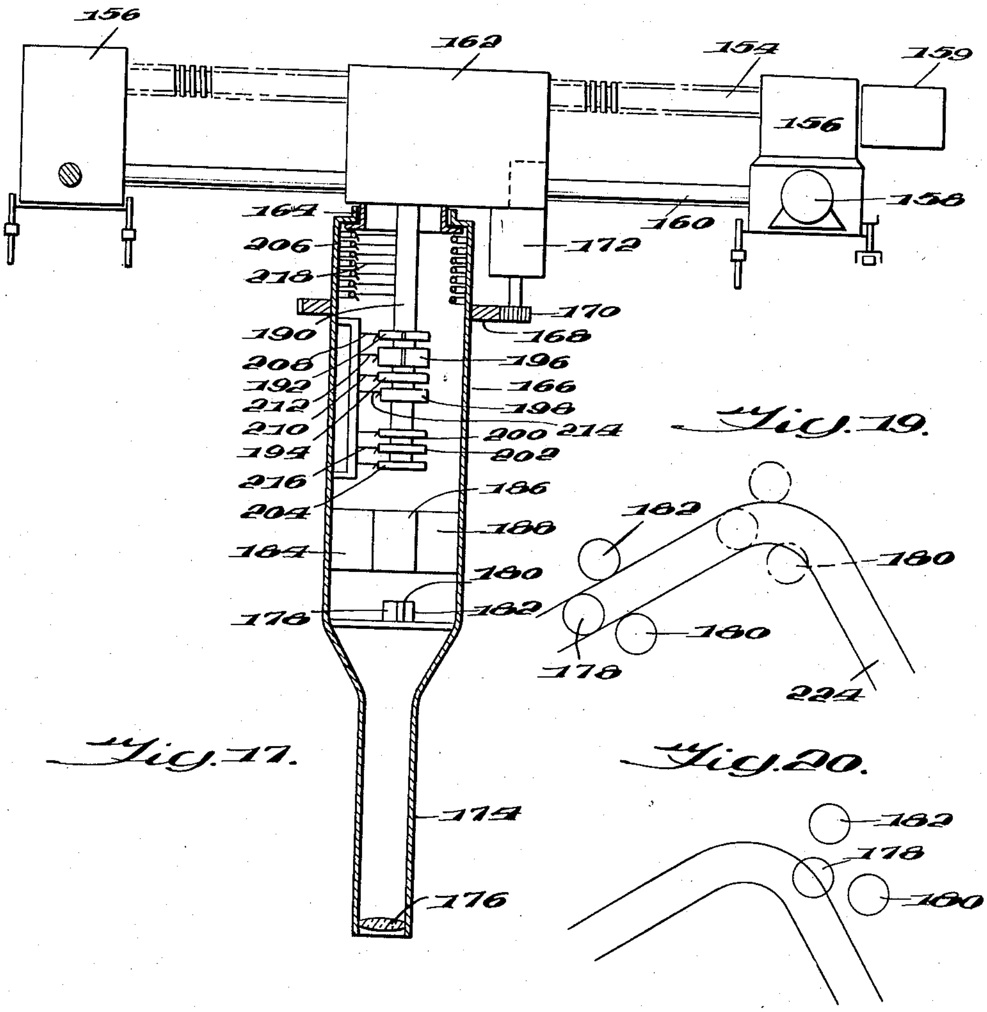
Fig. 17 is a side elevation of the arrangement of Fig. 16.
Figs. 19, 20 and 21 are diagrams explaining the operation of the device shown in Figs. 16 to 18.
Figure 21:
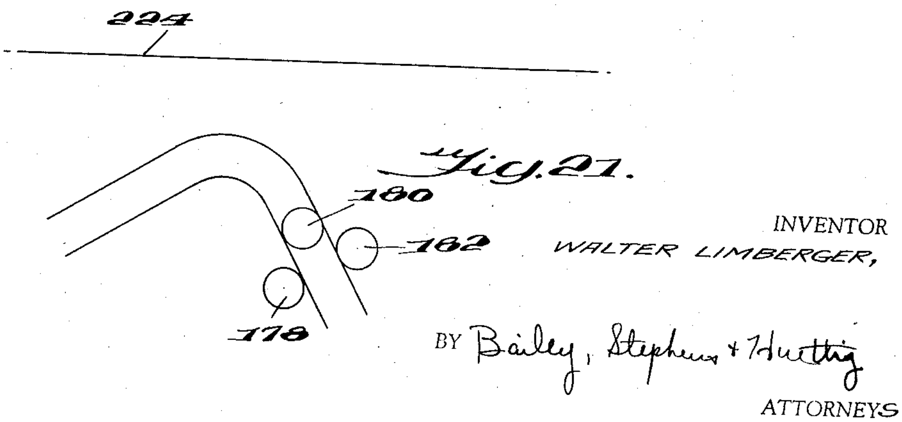

In operation, this arrangement is set above a table 224 on which appears the pattern to be traced. Referring now to Figs. 19 to 21, let us assume that the device is moving upwardly and to the right in Fig. 19, with the image of the line projected by lines 5 so positioned and photocell 178 is cut off from light while photocells 180 and 182 are both fully exposed. Now since no current will flow through photocell 178 to one side of motor 172, that motor will remain stationary, so that the angular position of casing 166 with respect to nut 162 will remain constant. However, by reason of the fact that brushes 208, 210, 212 and 214 will be positioned for example as shown in dotted lines in Fig. 18, motors 158, 159 will be energized and will cause the casing 166 to follow along in the direction of the line 224 which is being traced. As long as movement continues in a straight line, there will be no disturbance of the equilibrium and the mechanism will continue to shift the device in such a straight line.

Let us suppose now that the arrangement reaches the position shown in broken lines in Fig. 19. At this point, photocell 178 will be partly exposed so as to allow some current to flow therethrough. At the same time, photocell 180 will be partly occluded, and amplifier 188 will send a different current to converter 222 from that transmitted by amplifier 184. This will throw converter 222 out of balance, and will cause a current to be sent to motor 172 which will cause that motor to turn in a direction determined by the particular photocell which is partly occluded. Motor 172 will then rotate casing 166, thus changing the relative position of brushes 212 and 214 with respect to the potentiometer rings 196, 198. This will change the current supply to motors 158, 159 and to the receiver motors in such a way as to cause a change of movement downwardly in Fig. 19, and this movement will continue until the device, having first reached the position shown in Fig. 20, shifts to that of Fig. 21 in which it is again following the desired line, the motor 172 having of course caused the relative angular position of the photocells to vary in the manner shown in the drawings.

The modification of Fig. 22 is intended to be used for photoelectric control or manual control. Nut 162 and motor 172 are mounted and driven just as in the modification of Fig. 17. However, a downward extension 226 from nut 162 has rotatably supported on it a casing 228 which is driven through gearing 230 by motor 172. Mounted within this casing and connected to it by a ring 232 is a casing 234 corresponding to casing 166 of Fig. 17, and containing the various rings and brushes shown therein. Casing 228 also contains the lens 176, photocells such as 182 and amplifiers such as 188 of Fig. 17. Stem 236, corresponding to stem 190 of Fig. 17, extends downwardly below casing 234. Tiltably mounted on this stem is a casing 238 containing potentiometer rings, slip rings and contact rings similar to those of Figs. 3 and 4.

On the outside of casing 228 is tiltably arranged another casing 240, which is normally held centered with respect to the casing 228 by a rubber ring 242 positioned between them.

Stems 244 extending through holes 246 in casing 228 connect casings 238 and 240 rigidly together, so that tilting of one causes tilting of the other. These stems may also serve as conductors for leading electrical current to various parts of the mechanism.

Such a structure can be used alternatively for either manual or automatic operation. Tilting of casing 240 in the direction of the track to be followed will tilt casing 238 and cause the whole device to operate in the manner of that of Figs. 3 to 7. On the other hand, if the device is to be actuated automatically, this will be accomplished in the same manner as in Figs. 17 to 21 by the photocells. The change from one operation to the other is accomplished simply by means of switch 248 of Fig. 23.

Figures 23, 24, 25:
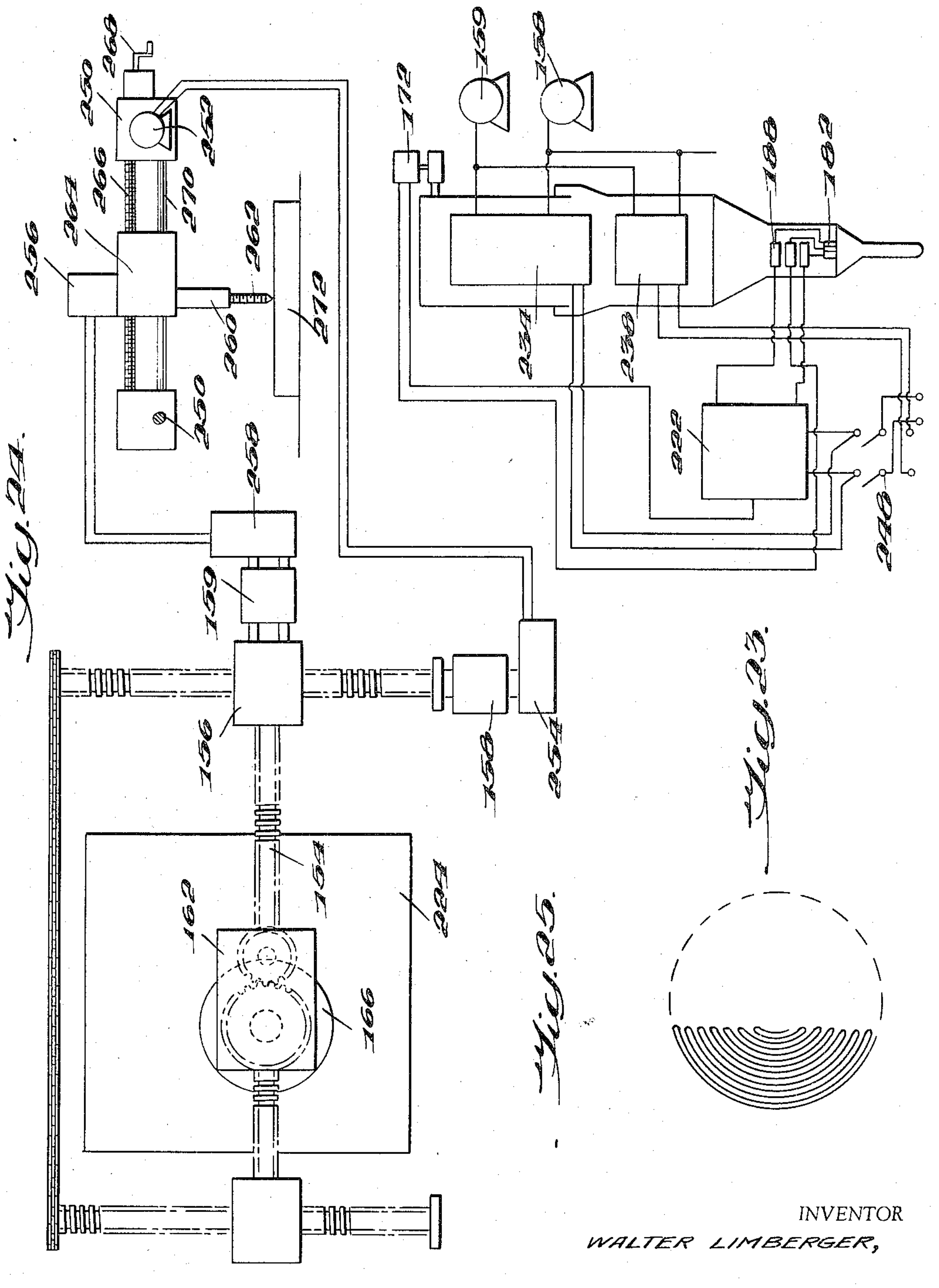
Fig. 23 is a wiring diagram of the arrangement of Fig. 22.
Fig. 24 shows still another arrangement embodying the invention for use in shaping three dimensional objects.
Fig. 25 is an explanatory diagram in connection with the device shown in Fig. 24.

It is sometimes desirable to control a device, such as a cutter, to produce a three dimensional figure in response to a two dimensional pattern. An arrangement for accomplishing this result is shown in Fig. 24. The transmitter shown here is of the same type as in Figs. 17 to 21. The receiver on the other hand includes a pair of nuts 250 driven by a motor 252 controlled in response to motor 158 through transmitter 254, and a second motor 256 controlled by motor 159 through transmitter 258. This second motor drives an internally threaded stem 260, in which is threaded a cutting member 262, so that upon rotation of motor 266 cutting member 262 is raised or lowered. These parts are mounted on a nut 264 threadedly engaging a threaded shaft 266 which may be turned by a crank 268, and also slidably engaging a smooth shaft 270.

If now the casing 166 of the transmitter follows a given curve, that curve will be reproduced in a vertical plane (depending on setting of crank 268) running perpendicular to the plane of the drawing of Fig. 24. Thus the cutter 262 will cut a corresponding curve on the surface of a block 272 which is located beneath the cutter.

As soon as one curve has been cut, the crank 268 is turned to shift cutter 262 into an adjacent plane and other curve is traced.

For example, as shown in Fig. 25, in cutting a partly spherical shape, the transmitter may be caused to trace the back and forth lines 274 in that figure. At the end of each arc, crank 268 is turned to shift to another plane, and the device will continue to operate until the partly spherical surface is cut.

While I have described herein some embodiments of my invention, I wish it to be understood that I do not intend to limit myself thereby except within the scope of the claims hereto or hereinafter appended.

I claim:

1. In apparatus for transmitting the movement of a point to a distance, two motion-imparting mechanisms each including a first pair of parallel threaded shaft, nuts mounted on said shafts, a third threaded shaft rotatably mounted in said nuts, and a third nut non-rotatably mounted on said third shaft, a tracing means carried by the third nut of the first of said mechanisms, a follower carried by the third nut of the second mechanism, said tracing means having their longitudinal axis rigid with the third nut of the first mechanism, motor means for driving said shafts synchronously with one another, said tracing means having a part carried thereby shiftable with respect to said nut in accordance with deviations from the line of the tracing means axis, and means responsive to shifting movement of said part with respect to said nut to control said motor means to move said third nut in such a direction as to restore the axis of the tracing means to the line.

2. In apparatus as claimed in claim 1, said movement responsive means including potentiometers, means operatively connected to said shiftable part for varying said potentiometers in response to movement of said part, said motor means being electrical, and a circuit including a source of current, said motor means and said potentiometers.

3. In apparatus as claimed in claim 2, each potentiometer comprising two substantially semicircular setcions insulated from one another by gaps between the ends thereof, said shiftable part having contacts engageable with said sections, the gaps of one potentiometer being in a line at right angles to those of the other.

4. In apparatus as claimed in claim 1, said shiftable part being turnable about said longitudinal axis.

5. In apparatus as claimed in claim 4, said tracing means including photoelectric means carried by said part, and means operatively connected to said photoelectric means to turn the part.

6. In apparatus as claimed in claim 5, said movement responsive means including potentiometers, means operatively connected to said shiftable part for varying said potentiometers in response to movement of said part, said motor means being electrical, and a circuit including a source of current, said motor means and said potentiometers.

7. In apparatus for transmitting the movement of a point to a distance, comprising a supporting, tracing means associated with said support, means mounting said support for movement along two axes forming angles with one another, control means operable to cause said support to move so that said tracing means follows a desired line, said control means including a member turnable about an axis with respect to said support, three photocells arranged in a triangle carried by said member, a motor for turning said member with respect to said support, motor means to move said support along said axes, means responsive to variations of light on said photocells to supply current to said motor to turn said member so that the line from one of said photocells which bisects the line joining the other two photocells turns in the direction of the desired line, and means responsive to the position of said member with respect to said support to supply current to said motor means to shift the support in such a direction as to follow the line.

8. In apparatus as claimed in claim 7, a manually movable part movably carried by said support, and means responsive to movement of said part with respect to the support to supply current to said motor means to shift the support in such a direction as to correct deviations from the desired line.

9. In apparatus as claimed in claim 8, said manually movable part being universally mounted on said support about a pivot point located substantially in a line perpendicular to said axes and passing through the support, an electric circuit supplying current to said motor means, and potentiometer means in said circuit operatively connected to said part for variation by movement thereof with respect to the support.

10. In apparatus as claimed in claim 9, each potentiometer comprising two substantially semicircular sections insulated from one another by gaps between the ends thereof, said manually movable part having contacts engageable with said sections, the gaps of one potentiometer being in a line at right angles to those of the other.

References Cited in the file of this patent

UNITED STATES PATENTS

| | | |
|---|---|---|
| 2,445,041 | Scholz | July 13, 1948 |
| 2,462,904 | Rosen | Mar. 1, 1949 |
| 2,530,428 | Gray | Nov. 21, 1950 |
| 2,627,055 | Calosi | Jan. 27, 1953 |

OTHER REFERENCES

Optical Contour Follower, General Electric Review, June 1950, pp. 44–47, Fig. 1.